United States Patent [19]
Bullock et al.

[11] 3,964,914
[45] June 22, 1976

[54] ELECTROMARKING SOLUTION

[75] Inventors: Jonathan S. Bullock, Oak Ridge; William L. Harper, Wartburg; Charles G. Peck, Oak Ridge, all of Tenn.

[73] Assignee: The United States of America as represented by the United States Energy Research and Development Administration, Washington, D.C.

[22] Filed: Aug. 16, 1974

[21] Appl. No.: 498,146

[52] U.S. Cl. .................................. 106/19; 106/14; 106/20; 148/6.2; 156/2; 204/129.75; 252/79.1
[51] Int. Cl.² .......................................... C09D 11/00
[58] Field of Search .................. 106/1, 19, 14, 2, 0; 252/79.1; 156/2; 204/29, 54 R, 55 R, 129.75; 148/6.2

[56] References Cited
UNITED STATES PATENTS

| | | | |
|---|---|---|---|
| 3,295,999 | 1/1967 | Klein et al. | 106/1 |
| 3,563,811 | 2/1971 | de Ridder | 148/6.2 |

*Primary Examiner*—Lorenzo B. Hayes
*Attorney, Agent, or Firm*—Dean E. Carlson; David S. Zachry; Earl L. Larcher

[57] ABSTRACT

This invention is directed to an aqueous halogen-free electromarking solution which possesses the capacity for marking a broad spectrum of metals and alloys selected from different classes. The aqueous solution comprises basically the nitrate salt of an amphoteric metal, a chelating agent, and a corrosion-inhibiting agent.

3 Claims, No Drawings

ELECTROMARKING SOLUTION

This invention was made in the course of, or under, a contract with the U.S. Atomic Energy Commission.

The present invention relates generally to an electromarking solution for metallic materials, and more particularly to such a solution which is especially characterized by being halogen-free and by being capable of marking a wider spectrum of metals and alloys than any single electromarking solution previously employed.

Various metallic materials are marked with identifying indicia by employing an electromarking operation wherein an etching solution is placed in contact with the metallic material through a suitable configured template, and then a suitable electrical current is passed through the solution to selectively dissolve the surface of the metallic material at sites corresponding to the configuration of the perforations through the template. An electromarking solution having essentially universal marking capabilities for the many different metallic materials useful by any particular industry would be advantageous from many standpoints which include greater efficiency and significant cost reductions. The commercially available marking solutions were not found to be satisfactory for use in multiple metal marking applications. In fact, it was found that in order to electromark several different metals with the commercially available marking solutions, one solution would be required for aluminum, another for steel, and still another for copper, etc. Further, the presence of halogens in such marking solutions was found to be particularly undesirable since they cause corrosion and cracking of many metals and alloys. Also, some of these marking solutions did not provide adequate corrosion inhibition for deterring corrosion of surface areas contiguous to the marked surface as well as other surface areas contacted by accidental spills of the marking solution.

Accordingly, it is the primary aim or goal of the present invention to provide an improved electromarking solution which is characterized by a halogen-free formulation, corrosion-inhibiting properties, and a capability of legibly marking metallic materials selected from a significantly larger spectrum of different metallic materials than any single or several of the previously available electromarking solutions. This goal is achieved by employing an aqueous halogen-free electromarking solution which consists essentially of a water-soluble nitrate salt of an amphoteric metal in a concentration of about 0.085 to 0.139 mole per liter of solution, a chelating agent consisting of a water-soluble compound having an anion selected from the group consisting of citrate, tartrate, oxalate, and ethylenediaminetetraacetic acid with said agent being in the solution in a concentration in a range of about 0.071 to 0.103 mole per liter of solution, and a corrosion-reducing agent having an anion selected from the group consisting of $Cr_2O_7^=$, $CrO_4^-$, $VO_3^-$, $S_2O_8^=$, $MoO_4^=$, $WO_4^=$, $TcO_4^-$, as well as amines or other organic inhibitors in a concentration range of about 0.017 to 0.031 moles per liter. The pH is in the range of 2.3 to 10.0. Aqueous ammonia can be used to raise the pH from the value 2.3, characteristic of the original solution, to the value desired.

Other and further objects of the invention will be obvious upon an understanding of the illustrative electromarking solutions about to be described or will be indicated in the appended claims, and various advantages not referred to herein will occur to one skilled in the art upon employment of the invention in practice.

Generally, the present invention is directed to an aqueous electromarking solution which comprises the formulation of a nitrate salt of an amphoteric metal in which the metal is selected from the group consisting of aluminum, tin, and zinc, a chelating compound having an alkali metal cation and a citrate, tartrate, oxalate, or ethylenediaminetetraacetic acid anion, and a corrosion-inhibiting agent selected from an absorption-type organic corrosion inhibitor or a compound having an alkali metal cation and oxidizing oxyanion.

In order to mark the metallic material with the solution of the present invention, a stencil or template formed of a thin, impermeable material such as coated paper or the like is provided with suitable indicia which penetrates through the stencil. The stencil is then placed upon the metallic material at an appropriate location. A metal bar covered by an absorptive pad containing the marking solution is pressed against the stencil surface and then an alternating current with a p-p sinusoidal voltage of about ± 5 to 20 volts is passed through electrodes coupled to the metal surface and the solution-carrying bar, to effect marking by selective etching of the metal surface (due to the dissolution of the metallic material by transport of metal ions into the solution), with possible re-deposition of material from the solution.

The duration required for marking the various metallic materials normally ranges from 5 to 30 seconds depending upon the difficulty of etching the particular material. For example, aluminum and magnesium are relatively difficult to etch and require a longer duration of contact with the marking solution, whereas copper and uranium, on the other hand, are readily etched and can be marked with a minimal time period.

The various metals and alloys found to be readily marked with the marking solution of the present invention include uranium, titanium, copper, aluminum, magnesium, thorium, nickel, lead, iron, and alloys or iron and above-mentioned metals such as U-7.5 wt.% Nb-2.5 wt.% Zr, Mg-3 wt.% Al-0.8 wt.% Zn, W-3 wt. % Ni-2 wt.% Fe, and 304L stainless steel. These metals and alloys were exposed to the marking solution at temperatures of 24°, 40°, and 100° C over a 7-day duration. Only the pure iron showed corrosion at 24° C after 7 days, and the uranium showed slight corrosion after exposure at 100° C for 7 days. However, the metallic materials generally endured this test without displaying corrosion of any significance through the entire exposure period.

The metal nitrate salts are selected from the nitrate salts of aluminum, tin and zinc, since these nitrate salts are readily soluble in water, are compatible with other components of the solution, and possess desirable etching properties in the solution of the present invention. The concentraction of the nitrate salts in the marking solution is in the range of 0.085 to 0.139 mole per liter of solution (mol/l.).

A solution pH in the range of 2.3 to 10.0 has been found to be satisfactory for marking virtually all metallic materials without encountering problems due to corrosion. The lower solution pH can be readily provided by using the aluminum nitrate. Slightly higher pH values can be achieved by substituting zinc nitrate. Ions provided by the aluminum, tin or zinc cation exist in the aqueous solution as hydroxy complexes and allow buffering the pH of the solution to a low value where this may be desired. If a still higher pH is desired for marking metallic material which has a surface contamination problem, or with which corrosion may be a problem, aqueous ammonia may be used to raise the pH to at least a value of 10. Low pH values in the range 2.3 – 5.5 may be desired for preventing the passivation of some workpiece materials. Conversely, where the material is subject to surface contamination as a result of prior history, high pH values may be required to promote dissolution of oils and fats. It has been found, however, that increasing the alkalinity with potassium hydroxide produces a solution of inferior marking ability. Aqueous ammonia can be used to increase alkalinity while retaining a marking ability equal to that of the acidified solution. It has been found necessary to retain the Al, Sn or Zn cation in the alkaline solution to retain superior marking ability. The superiority of aqueous ammonia is likely due to its complexing ability for metal cations. It has been found that the nitrate anion deters corrosion and corrosion cracking in pure $\alpha$-uranium and uranium alloys such as U-7.5 wt.% Nb-2.5 wt.% Zr.

The chelating agent employed in the electromarking solution complexes, adjacent to the workpiece, the free metal ions emanating from the workpiece. This complexing reduces the concentration of such ions in the solution near the surface for the purpose of increasing the rate at which the solution anodically dissolves selected portions of the metallic material. A citrate anion has been found to be particularly satisfactory for a free-ion complexing function because of its generally high association constant with a large number of ions of different metallic materials. However, the sodium salt of ethylenediaminetetraacetic acid as well as other moieties such as tartrate and oxalate could be readily substituted for the citrate. The complexing anions provided by the citrate, etc., are preferably employed in the solution as alkali metal compounds since such compounds provide for the ready solubility of the complexing agent in water. The concentration of the complexing agent found to be satisfactory in the solution is in the range of 0.071 to 0.103 mole per liter.

The corrosion inhibiting agents deter corrosion of the metallic material contacted by the solution by driving the electrode potential of the material into a passive region (in the case of the oxidizing types) or by adsorbing on otherwise corrosion-active sites (in the case of the adsorption types). For the purpose of providing this corrosion-inhibiting function the dichromate ion is frequently the moiety of choice because it inhibits corrosion of a significantly large number of metallic materials. Further, the electromarking action of the solution appeared to be enhanced by the presence of the dichromate ion. The dichromate ion is preferably used in the solution as an alkali metal compound, e.g., potassium dichromate or sodium dichromate because of its water-soluble properties. However, in cases where the electromarking enhancement provided by the dichromate ion is not required, an adsorption-type organic corrosion inhibitor may be employed in its place. For example, ethylenediamine, paraformaldehyde, and other difunctional amines and alcohols capable of ring formation during adsorption can provide the desired corrosion inhibition. The concentration of the corrosion-inhibiting agent in the electromarking solution is in the range 0.017 to 0.031 mole per liter.

The pH of the electromarking solution found to be satisfactory for marking the above-mentioned metals is in the range of 2.3 to 10. A pH greater than 10 was not found to be convenient because of the volatility of the aqueous ammonia. Conversely, a pH of less than about 2.3 did not function satisfactorily because of rapid chemical attack on some metals, such as Fe. The pH of the solution may be readily controlled by selectively varying the concentration of the aqueous ammonia and/or nitrate salt of the amphoteric metals employed therein.

In order to provide a more facile understanding of the present invention, typical applications of the electromarking solution are set forth in the examples below.

EXAMPLE I

An electromarking solution was prepared with a composition consisting of 48 g/l. (0.13 moles/liter) aluminum nitrate monohydrate, 30 to 32 g/l. (0.10 mole/liter) of potassium citrate monohydrate and 8 g/l. (0.03 mole/liter) of potassium dichromate. The pH of the marking solution was 2.3. The metallic materials, U, Th, Ti, Cu, Al, Mg, Ni, Pb, Fe, and alloys of same were electromarked in this solution by the aforementioned technique using a p-p sinusoidal voltage of ± 20 volts. Each of these metals and alloys was distinctly marked and exhibited negligible corrosion after exposure to the solution for 7 days at temperatures of 24°, 40°, 50°, and 100° C, except for Fe and U which exhibited slight but not significant corrosion.

EXAMPLE II

In this example the potassium citrate monohydrate was replaced with 24 g/l. (0.1 mole/liter) of potassium tartrate semihydrate. The pH of the solution was approximately 2.5. The metals and alloys marked by the solution described in Example I were marked by this solution in the manner set forth above and each metallic material exhibited a distinct black legible mark. No corrosion of these marked materials was observed on exposure to ambient conditions.

EXAMPLE III

An electromarking solution was prepared with a composition consisting of 33 g/l. (0.11 moles/liter) zinc nitrate hexahydrate, 30 to 32 g/l. (0.10 mole/liter) of potassium citrate monohydrate and 8 g/l. (0.03 mole/liter) of potassium dichromate. The pH of the marking solution was 5.1. The metallic materials, U, Th, Mg, and alloys of same were electromarked in this solution by the aforementioned technique using a p-p sinusoidal voltage of ± 20 volts.

EXAMPLE IV

In this example the chelating agents potassium oxalate and the sodium salt of ethylenediaminetetraacetic acid in concentrations of 0.071 mol./l. to 0.103 mol./l., were employed in the solutions. Metallic materials as employed in Example I were marked in the same manner as described above. The resulting markings on the metallic material were legible and exhibited no corrosion on exposure to ambient conditions.

It will be seen that the electromarking solution of the present invention is particulary desirable since it possesses a capability of marking metallic materials selected from a significantly larger spectrum of metallic materials than markable by any single previously available electromarking solution. The chloride ion which induced corrosion and corrosion cracking and found to be necessary in previous marking solutions has been intentionally excluded from the solution. The concentration of chloride or other halides in the marking solution is below 10 ppm; hence for the purposes of this description and claims, the term "halogen-free" is descriptive of a solution containing less than 10 ppm halogen. Ions of metals such as cobalt, used in various commercial solutions, precipitate as metals or as highly conductive oxides onto the surface of the workpiece. Such precipitates accelerate corrosion of the metallic material surface by cathodic depolarization. The dichromate used in the subject formulation similarly leads to precipitation of Cr oxides which, however, are less deleterious than Co oxides. The elimination of cobalt ions as well as halogens from the electromarking solution of the present invention did not prevent the solution from legibly marking the many metals and alloys.

As various changes may be made in the method steps, and the concentration of solution constituents without departing from the spirit and scope of the invention and without sacrificing any of its advantages, it is to be understood that all matter herein is to be interpreted as illustrative and not in a limiting sense.

What is claimed is:

1. An aqueous halogen-free electromarking solution consisting essentially of a water-soluble nitrate salt of an amphoteric metal selected from the group consisting of zinc, aluminum and tin in a concentration of about 0.085 to 0.139 mole per liter of solution, a chelating agent consisting of a water-soluble compound for complexing free metal ions in said solution with said chelating agent being in the solution with a concentration range of about 0.071 to 0.103 mole per liter of solution, and having an anion contributor selected from the group consisting of citrate, tartrate, oxalate, and ethylenediamine-tetraacetic acid, a corrosion-inhibiting agent in a concentration of 0.017 to 0.031 mole per liter of solution and selected from the group consisting of alkali metal chromates, dichromates, molybdates, tungstates, technetiates, vanadates, peroxydisulphates, and ethylenediamine, and paraformaldehyde, and a solution pH in the range of 2.3 to 10.0.

2. The electromarking solution claimed in claim 1, wherein the cation contributor of the chelating agent containing the anion selected from the citrate, tartrate, oxalate, and ethylenediaminetetraacetic acid is an alkali metal.

3. The electromarking solution claimed in claim 1 wherein the pH of said solution is in the range of 2.3 to 5.5.

* * * * *